US 8,182,936 B2

(12) United States Patent
Tamura et al.

(10) Patent No.: US 8,182,936 B2
(45) Date of Patent: May 22, 2012

(54) TEMPERATURE CONTROL DEVICE FOR ON-BOARD BATTERY PACK

(75) Inventors: Hiroshi Tamura, Nagoya (JP); Koichi Ban, Tokai (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 937 days.

(21) Appl. No.: 12/200,061

(22) Filed: Aug. 28, 2008

(65) Prior Publication Data

US 2009/0078400 A1   Mar. 26, 2009

(30) Foreign Application Priority Data

Sep. 24, 2007   (JP) ................. 2007-246367

(51) Int. Cl.
| H01M 2/36 | (2006.01) |
| H01M 2/12 | (2006.01) |
| H01M 10/50 | (2006.01) |
| B60K 6/20 | (2007.10) |

(52) U.S. Cl. .......... 429/72; 429/82; 429/120; 180/65.21
(58) Field of Classification Search .................... 429/72, 429/82, 120; 180/65.1, 65.21
See application file for complete search history.

(56) References Cited

U.S. PATENT DOCUMENTS

| 6,148,910 A | 11/2000 | Warner |
| 6,394,210 B2 * | 5/2002 | Matsuda et al. ............. 180/68.1 |
| 6,750,630 B2 | 6/2004 | Inoue et al. |
| 7,988,543 B2 * | 8/2011 | Major .......................... 454/107 |
| 2006/0080986 A1 | 4/2006 | Inoue |
| 2007/0243427 A1 * | 10/2007 | Hayashi et al. ................. 429/13 |
| 2008/0202137 A1 | 8/2008 | Inoue |

FOREIGN PATENT DOCUMENTS

| CN | 1860045 | 11/2006 |
| EP | 1 057 668 | 12/2000 |
| JP | 59-035207 | 3/1984 |
| JP | 07-073906 | 3/1995 |
| JP | 11-040212 | 2/1999 |
| JP | 11-283678 | 10/1999 |
| JP | 2001-018635 | 1/2001 |
| JP | 2001-291532 | 10/2001 |
| JP | 2003-032901 | 1/2003 |
| JP | 2003-184721 | 7/2003 |
| JP | 2004-001674 | 1/2004 |

(Continued)

OTHER PUBLICATIONS

Chinese Office Action dated Jan. 15, 2010, issued in corresponding Chinese Application No. 200810165667.1, with English translation.

(Continued)

*Primary Examiner* — Patrick Ryan
*Assistant Examiner* — Julian Anthony
(74) *Attorney, Agent, or Firm* — Nixon & Vanderhye PC

(57) ABSTRACT

A temperature control device has a heat exchanger recovering heat from exhaust gas of an engine, a water circulating passage in which a cooling water is circulated while receiving the recovered heat, an air conditioning unit heating air with the hot cooling water of the passage to produce a temperature controlled air, an air duct, a water heater attached to the bottom surface of a battery pack, and an electric heater attached side surfaces of the pack. The conditioning unit blows the controlled air against the battery pack through the duct. The water heater receives the hot cooling water of the passage and raises the temperature of the battery pack. The electric heater subsidiarily warms the battery pack with heat generated from electric power of the pack.

34 Claims, 6 Drawing Sheets

| FOREIGN PATENT DOCUMENTS | | |
|---|---|---|
| JP | 2004-331024 | 11/2004 |
| JP | 2006-143183 | 6/2006 |
| JP | 2006-151091 | 6/2006 |
| JP | 2007-115463 | 5/2007 |

OTHER PUBLICATIONS

Japanese Office Action dated Jul. 7, 2009, issued in corresponding Japanese Application No. 2007-246367, with English translation.

* cited by examiner

FRONT SIDE (UPSTREAM SIDE)   REAR SIDE (DOWNSTREAM SIDE)

TEMPERATURE CONTROL DEVICE FOR ON-BOARD BATTERY PACK

CROSS-REFERENCE TO RELATED APPLICATION

This application is based upon and claims the benefit of priority of the prior Japanese Patent Application 2007-246367 filed on Sep. 24, 2007, so that the contents of which are incorporated herein by reference.

BACKGROUND OF THE INVENTION

1. Field of the Invention

The present invention relates to a temperature control device which regulates the temperature of a battery pack mounted in a vehicle.

2. Description of Related Art

A battery temperature control device for regulating the temperature of a battery pack mounted in a vehicle is disclosed in Published Japanese Patent First Publication No. 2004-1674. In this device, to prevent the temperature of the battery pack from being excessively heightened, the temperature of air is regulated in an air control unit, and the temperature-controlled air (hereinafter, called controlled air) is led from the control unit to the battery pack through a duct to regulate the temperature of the battery pack. Therefore, the control unit can prevent the temperature of the battery pack from being excessively heightened, so that the battery pack is not degraded.

In contrast, when the temperature of the battery pack is excessively lowered, it is required to raise the temperature of the battery pack for the purpose of preventing the output of the battery pack from being lowered. Because vehicles having water-cooled engines are usually used, a cooling water of the engine is heated by the heat generated in the engine, and the control unit produces hot air by using the heat of the hot cooling water. Therefore, when the hot air is blown against the battery pack, the temperature of the battery pack can be increased.

However, the rate of heat transfer required to warm up the battery pack is approximately five times higher than that required to cool the battery pack. Therefore, as compared with a case where the warmed battery pack is cooled down, when the hot air is blown against the battery pack, the rate of heat transfer to the battery pack is insufficient to warm up the pack. Therefore, it takes a long time to warm up the excessively cooled battery pack, or it is difficult to sufficiently warm up the cooled battery pack to a desired temperature. Especially, when the driving operation of the cooled engine is started on condition that the temperature of cooling water of the engine is considerably lowered, it takes a long time to produce hot air in the control unit. Therefore, it is difficult to quickly or reliably raise the temperature of the battery pack.

Further, the thermal diffusion from ends of the battery pack to the vehicle compartment is larger than that from the center of the battery pack. When the battery pack is gradually warmed up, a temperature difference inevitably occurs in the battery pack. Therefore, it is difficult to uniformly warm the whole battery pack.

Moreover, there is an idea that the charging and discharging operations are repeatedly performed in the battery pack to generate the heat in the battery pack by using the internal resistance of the pack. However, although the battery pack can be quickly and uniformly warmed up, the electric power of the battery pack is used only for warming the pack. Therefore, fuel consumption is undesirably increased so as to deteriorate fuel economy of the vehicle.

SUMMARY OF THE INVENTION

A main object of the present invention is to provide, with due consideration to the drawbacks of the conventional, a temperature control device which quickly and sufficiently raises the temperature of an on-board battery pack without increasing fuel consumption.

A subordinate object of the present invention is to provide a temperature control device which uniformly raises the temperature of the battery pack.

According to a first aspect of this invention, the main object is achieved by the provision of a temperature control device, comprising an air conditioning unit that regulates the temperature of air to produce a temperature controlled air and outputs a portion of the temperature controlled air to a vehicle compartment, an air duct through which a remaining portion of the temperature controlled air is led to a battery pack so as to be blown against the battery pack, and a fluid heating member, attached to the battery pack, that raises the temperature of the battery pack with a heating fluid heated by an engine or heated with exhaust gas of the engine.

With this structure of the temperature control device, when the driving operation of the engine is started, the temperature of the cooling water is raised. The air conditioning unit produces the temperature controlled air by heating air with the hot cooling water, blows a portion of the temperature controlled air to the vehicle compartment and blows the remaining portion of the temperature controlled air against the battery pack through the air duct. Further, a heating fluid is heated by the engine or heated with the exhaust gas of the engine, and the fluid heating member attached to the battery pack raises the temperature of the battery pack with the heating fluid.

Accordingly, because the battery pack is heated with the heating fluid of the fluid heating member, in addition to the heating with the controlled air, the temperature of the battery pack can be reliably raised.

Further, because the battery pack is directly heated with the heating fluid without using any air intervening between the fluid heating member and the battery pack, the rate of heat transfer based on the fluid heating member can be considerably increased as compared with a case where the battery pack is warmed up only by the controlled air. Accordingly, the temperature of the battery pack can be quickly and reliably raised.

To achieve the subordinate object, it is preferred that the temperature control device further comprises a first temperature sensor disposed at the center of the battery pack, a second temperature sensor disposed at an end of the battery pack, an electric heater attached to a side surface of the battery pack adjacent to the end of the battery pack, and a temperature control unit. The first temperature sensor measures the temperature of the battery pack at the center of the battery pack. The second temperature sensor measures the temperature of the battery pack at the end of the battery pack. The electric heater receives electric power, generates heat from the electric power and raises the temperature of the battery pack with the generated heat. The temperature control unit controls the electric power received by the electric heater according to measured results of the temperature sensors to regulate the temperature of the battery pack.

Generally, heat at the end of the battery pack is easily dissipated as compared with heat at the center of the battery pack. Therefore, the temperature of the battery pack at the end of the battery pack is apt to be lower than that at the center of the battery pack. However, the electric heater is attached to a side surface of the battery pack adjacent to the end of the battery pack and warms up the side surface of the battery pack with the heat generated by the electric power of the battery pack.

Accordingly, the temperature of the battery pack can be uniformly raised.

According to a second aspect of this invention, the main object is achieved by the provision of a temperature control device, comprising an air conditioning unit that regulates the temperature of air to produce a temperature controlled air and outputs a portion of the temperature controlled air to a vehicle compartment, an air duct through which a remaining portion of the temperature controlled air is led to a battery pack so as to be blown against the battery pack, a heat recovery unit that recovers heat of the exhaust gas, a fluid circulating passage, communicated with the heat recovery unit, in which a heating fluid is circulated while receiving the recovered heat from the heat recovery unit, and a fluid heating member, attached to the battery pack, that raises the temperature of the battery pack with the heating fluid circulated in the fluid circulating passage.

With this structure of the temperature control device, in the same manner as in the first aspect, the air conditioning unit blows a portion of the temperature controlled air to the vehicle compartment and blows the remaining portion of the temperature controlled air against the battery pack through the air duct. Further, a heating fluid circulated in the fluid circulating passage receives the heat recovered from the exhaust gas in the heat recovery unit, and the fluid heating member attached to the battery pack raises the temperature of the battery pack with the heating fluid.

Accordingly, because the battery pack is heated with the heating fluid of the fluid heating member, in addition to the heating with the controlled air, the temperature of the battery pack can be reliably raised.

Further, because the battery pack is directly heated with the heating fluid without placing any air between the fluid heating member and the battery pack, the rate of heat transfer based on the fluid heating member can be considerably increased as compared with a case where the battery pack is warmed up only by the controlled air. Accordingly, the temperature of the battery pack can be quickly and reliably raised.

DETAILED DESCRIPTION OF THE PREFERRED EMBODIMENTS

Figure 1:
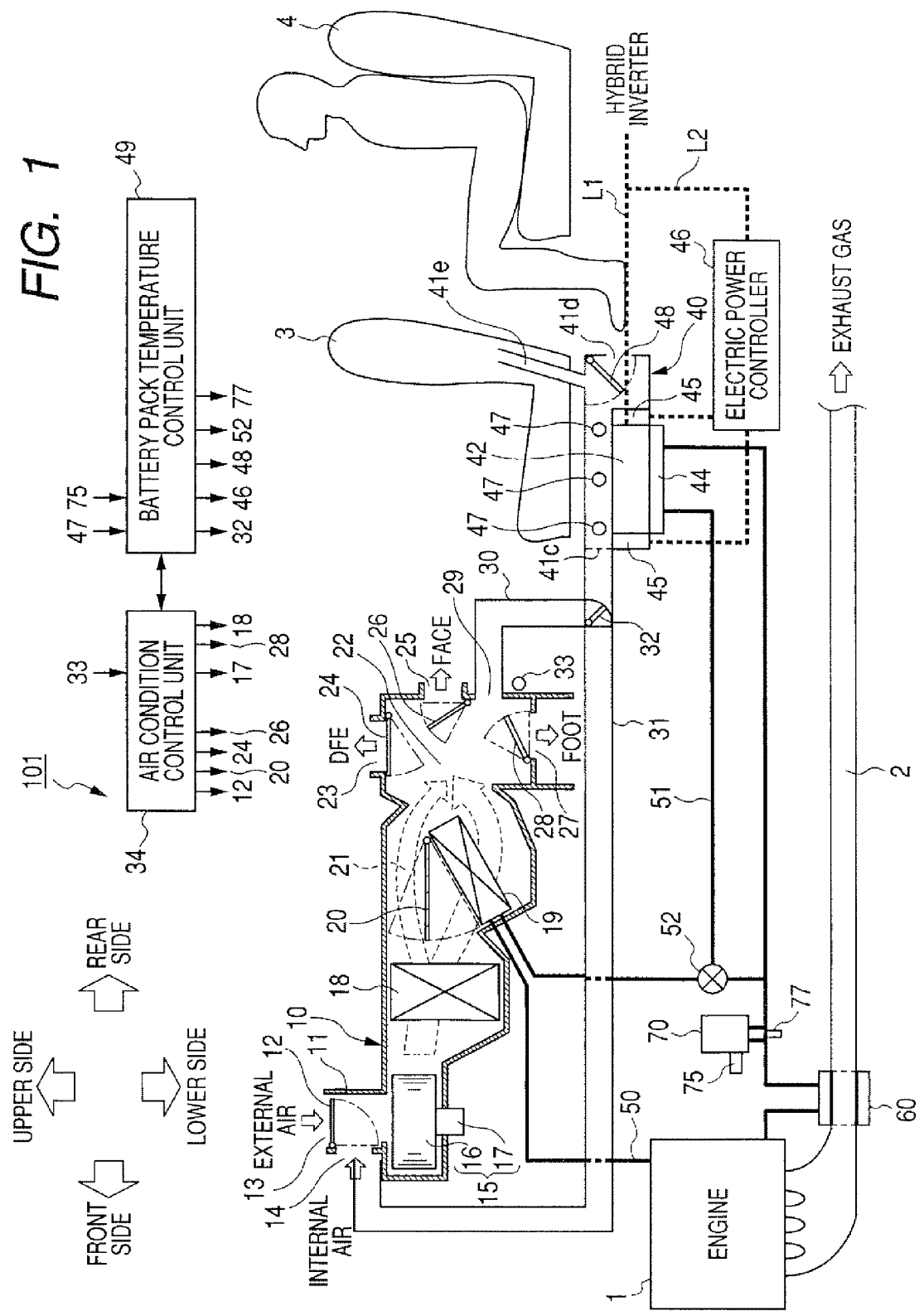
FIG. 1 is a schematic view of a temperature control device for an on-board battery pack according to the first embodiment of the present invention.

Embodiments of the present invention will now be described with reference to the accompanying drawings, in which like reference numerals indicate like parts, members or elements throughout the specification unless otherwise indicated.

Embodiment 1

FIG. 1 is a schematic view of a temperature control device for an on-board battery pack according to the first embodiment. A temperature control device 101 shown in FIG. 1 is, for example, disposed on a hybrid vehicle which has a water-cooled internal combustion engine 1 and an electric motor (not shown) as a driving power source. The electric motor receives electric power from an on-board battery pack 40 to run the vehicle in cooperation with the engine 1. The device 101 is used to warm up or cool down the battery pack 40.

As shown in FIG. 1, the control device 101 has an air conditioning unit 10 for regulating the temperature of air to produce a temperature controlled air and blowing a portion of the controlled air toward a vehicle compartment, an air duct 30 through which the remaining portion of the controlled air is led to the battery pack 40 to regulate the temperature of the pack 40, and a hot water heater (or fluid heating member) 44, directly attached to the bottom or lower surface of the battery pack 40, for receiving hot cooling water heated in the engine 1 and/or heated with exhaust gas of the engine 1 as a heat source and heating the pack 40 with the hot cooling water. The duct 30 connects a battery opening 29 of the conditioning unit 10 disposed at the downstream side of the unit 10 and a duct connecting portion 41c of the battery pack 40.

To cool the engine 1 heated during the driving operation, cooling water is used. When the driving operation of the engine 1 is started, the cooling water is heated to become the hot cooling water. The conditioning unit 10 heats air with the hot cooling water to produce temperature controlled air. The conditioning unit 10 blows a portion of the controlled air toward a vehicle compartment. The remaining portion of the controlled air outputted from the conditioning unit 10 is led to the battery pack 40 through the duct 30 and is blown against the pack 40 to regulate the temperature of the pack 40. Further, the hot water heater 44 receives the hot cooling water as a heat source. Because the heater 44 is directly attached to the bottom or lower surface of the pack 40, the heater 44 directly heats the pack 40 with the hot cooling water without placing any air between the heater 44 and the pack 40.

Accordingly, because the pack 40 is warmed by the heater 44 in addition to the controlled air of the conditioning unit 10, the temperature of the pack 40 can be reliably and sufficiently raised. Further, because the heater 44 directly heats the pack 40 with the hot cooling water without placing any air between the heater 44 and the pack 40, the rate of heat transfer to the pack 40 is considerably increased. Accordingly, the temperature of the pack 40 can be quickly raised.

The control device 101 may have an exhaust gas heat exchanger (or heat recovery unit) 60 for recovering the heat of exhaust gas passing through an exhaust pipe 2 of the engine 1, a cooling water circulating passage 50 in which the cooling water is circulated through the engine 1, the conditioning unit 10, the heat exchanger 60 and the heater 44, and a heat storage tank 70 disposed in the passage 50. When the driving operation of the engine 1 is started, the cooling water is circulated in the passage 50 by a circulation pump (not shown). Further, the engine 1 is heated, and the engine 1 outputs exhaust gas to the pipe 2. Therefore, the cooling water is heated by the engine 1 and is heated with the recovered heat in the heat exchanger 60, and the hot cooling water is circulated in the passage 50. The conditioning unit 10 heats air with this hot cooling water and heats the pack 40 with the controlled air. The heater 44 heats the pack 40 with the hot cooling water.

Further, the tank 70 stores a major portion of the hot cooling water circulated in the passage 50. When the engine 1 is not operating, the hot cooling water of the passage 50 is easily cooled, but the tank 70 still stores the hot cooling water while minimizing the heat dissipation from the hot cooling water. When the driving operation of the engine 1 is restarted, the cooling water is circulated through the passage 50, and the hot cooling water of the tank 70 is mixed with the cooling water of the passage 50. Therefore, the temperature of the cooling water of the passage 50 is immediately raised. Then, the engine 1 and the heat exchanger 60 further heat the cooling water of the passage 50 to circulate the hot cooling water set at the sufficiently high temperature in the passage 50, and this hot cooling water is supplied to the heater 44 and the conditioning unit 10. Accordingly, even when the operation of the engine 1 is stopped for a long time, the temperature of the cooling water can be quickly raised by the tank 70, so that the temperature of the pack 40 can be quickly and reliably raised.

The control device 101 may have a second circulating passage 51 that is branched from the passage 50, passes through the hot water heater 44 and is returned to the passage 50 at a return point, a three way valve 52 disposed at the return point or branching point to allow the flow of the hot cooling water circulated through the passage 51 or to stop the flow of the hot cooling water circulated through the passage 51, a plurality of battery pack temperature sensors 47 attached to the pack 40, and a battery pack temperature control unit 49 for controlling the valve 52 according to the measured result of at least one of the temperature sensors 47 to regulate the temperature of the pack 40. The temperature sensors 47 are, respectively, disposed at the center of the pack 40, a front end of the pack 40 positioned on the upstream side of the pack 40 in the flow direction of the controlled air led to the pack 40 and a rear end of the pack 40 positioned on the downstream side of the pack 40 in the flow direction to measure the temperature of the pack 40 at the center and the ends of the pack 40.

When the control unit 49 judges according to the measured result of at least one of the temperature sensors 47 that the temperature of the pack 40 is too low to sufficiently output electric power from the pack 40, the control unit 49 control the valve 52 such that the hot cooling water is transmitted to the heater 44 through the passage 51 and the valve 52. In contrast, when the control unit 49 judges according to the measured result of at least one of the temperature sensors 47 that the pack 40 is set in an adequate temperature range, the control unit 49 controls the valve 52 such that no hot cooling water is transmitted to the heater 44 through the passage 51 and the valve 52. Accordingly, the temperature of the pack 40 can be adequately regulated.

The control device 101 may have an electric heater 45 directly attached to the side surfaces of the pack 40 adjacent to the front and rear ends of the pack 40, an electric power controller 46 for controlling electric power supplied from the pack 40 to the heater 45, and the control unit 49 for controlling the controller 46 according to the measured results of the temperature sensors 47 to uniformly set the temperature of the pack 40 in an adequate range. The heater 45 has heating members or coils and generates heat in the members when receiving electric power. A direct current power line L1 connects the pack 40 and a hybrid inverter HV (not shown) so as to supply the electric power of the pack 40 to the inverter, and a power line L2 is branched from the line L1 and is connected with the heater 45 through the controller 46.

As compared with the heat at the center of the pack 40, the heat at each end of the pack 40 is easily dissipated to the vehicle compartment. Therefore, a temperature difference easily occurs in the pack 40. In this embodiment, the side surfaces of the pack 40 are not directly warmed up by the heater 44 or the conditioning unit 10, but the electric heater 45 subsidiarily heats the side surfaces of the pack 40. The sensors 47 are disposed at the center and ends of the pack 40. Therefore, the control unit 49 can judge according to the measured results of the sensors 47 whether or not the temperature of the pack 40 is uniformly set at the center and the ends of the pack 40.

Accordingly, when the controller 46 regulates electric power supplied to the heater 45 under control of the control unit 49, the pack 40 can be uniformly warmed up.

Further, because the control unit 49 can correctly detect the average temperature of the pack 40 according to the measured results of the temperature sensors 47, the control device 101 can correctly and precisely raise the temperature of the pack 40.

Moreover, because the pack 40 is additionally warmed up by the heater 45, the temperature of the pack 40 can further be quickly raised.

The control device 101 may have an internal air inlet 14 at the upstream side of the conditioning unit 10, a suction duct 31 branched from the duct 30 and opened at the inlet 14 of the conditioning unit 10, and a first change door 32 disposed at the branching point of the duct 30 to communicate the pack 40 with the duct 30 or to communicate the pack 40 with the duct 31.

A portion of the controlled air is directly blown into the vehicle compartment to warm up or cool down the vehicle compartment, and the remaining portion of the controlled air blown against the pack 40 is output into the vehicle compartment. When the controlled air blown against the pack 40 has still the high or low temperature to warm or cool the vehicle compartment directly warmed or cooled, an occupant directly receiving the controlled air blown against the pack 40 has no uncomfortable feeling. In this case, the control unit 49 controls the door 32 according to the temperature sensors 47 to communicate the pack 40 with the duct 30. Therefore, even when the pack 40 is warmed or cooled with the controlled air, the controlled air blown against the pack 40 is output into the vehicle compartment to still warm or cool the vehicle compartment.

In contrast, when the temperature of the controlled air blown against the pack 40 to warm or cool the pack 40 is lowered or heightened, the controlled air blown against the pack 40 undesirably cools or warms the vehicle compartment directly warmed or cooled, so that it is expected that an occupant directly receiving the controlled air blown against the pack 40 has uncomfortable feeling. In this case, the control unit 49 controls the door 32 according to the temperature sensors 47 to communicate the pack 40 with the duct 31 and to close the duct 30. Therefore, the whole controlled air of the conditioning unit 10 is directly blown out into the vehicle compartment to warm or cool the vehicle compartment. Then, the air of the vehicle compartment passes through (or is absorbed into) the pack 40 to warm or cool the pack 40 and is returned to the conditioning unit 10 through the duct 31 as an internal air (i.e., air existing inside the vehicle compartment).

Accordingly, the temperature of the pack 40 can be adequately regulated without giving any uncomfortable feeling to the occupant.

The air conditioning unit 10 has an air conditioning case 11, made of resin such as polypropylene or the like, and air conditioning functional members 18, 19 and 20 disposed inside the case 11. The case 11 forms an air path of the controlled air blown toward the vehicle compartment. On the most upstream side of the conditioning unit 10, the case 11 has an external air inlet 13 through which an external air (i.e., air existing outside the vehicle compartment) is led into the case 11, the internal air inlet 14 through which the internal air of the suction duct 31 is led into the case 11, and an air changing door 12 for opening one of the inlets 13 and 14 and closing the other inlet to receive the internal or external air in the conditioning unit 10. The door 12 is driven by an electric driving unit (not shown) such as a servo motor. The duct 31 is opened near the inlet 14.

On the downstream side of the door 12, the air conditioning unit 10 has a blower 15 with a multi-blade fan 16 and a fan motor 17 to blow the air received through the inlet 13 or 14 toward the vehicle compartment through the case 11. A blower voltage applied to the motor 17 is controlled by a motor driving circuit (not shown) to adjust number of revolutions (or flow rate of blown air) in the blower 15.

On the downstream side of the blower 15, the air conditioning unit 10 has an evaporator 18 for cooling the air blown by the blower 15. The evaporator 18 has coolant. This coolant is reduced to a low pressure by a pressure reducing unit (not shown) in a refrigerating cycle and is vaporized while absorbing the heat of the air blown through the case 11. Therefore, the evaporator 18 is a type of coolant evaporator acting as a cooling heat exchanger.

On the downstream side of the evaporator 18, the air conditioning unit 10 has an air mixing door 20 and a heater core 19 disposed downstream the door 20. The door 20 is a plate-shaped rotating door driven by an electric driving unit (not shown) such as a servo motor. The door 20 divides the air path to a heater passing route and a bypass route 21 placed above the heater passing route without crossing the core 19. The door 20 adjusts a flow rate ratio of air passing through the heater core 19 to air passing through the bypass route 21. The heater core 19 heats the air to the hot air by the heat of the hot cooling water circulated in the passage 50. Therefore, the combination of the door 20 and the heater core 19 regulates the temperature of the air blown into the vehicle compartment.

On the downstream side of the heater core 19, the hot air passing through the heater core 19 and the air passing through the bypass route 21 are mixed in an air mixing zone 22, and the controlled air set at a desired temperature is produced. The battery opening 29 is disposed on the downstream side of the air mixing zone 22. The controlled air of the conditioning unit 10 is blown out to the air duct 30 through the opening 29.

Therefore, in this embodiment, the air conditioning unit 10 has an air temperature regulating unit composed of the evaporator 18, the heater core 19 and the air mixing door 20. However, the evaporator 18 and the heater core 19 may be serially disposed without the door 20 to regulate the temperature of the controlled air by the re-heat level of the air in the core 19.

The conditioning unit 10 may have an air blowing mode changing section on the most downstream side of the air path. More specifically, a defroster opening 23 is disposed on the upper surface of the case 11. A rotatable plate-shaped defroster door 24 attached to the case 11 opens and closes the opening 23. The controlled air is blown through the opening 23 against the inner surface of the front window of the vehicle. A face opening 25 is disposed on the rear side of the opening 23. A rotatable plate-shaped face door 26 attached to the case 11 opens and closes the opening 25. The controlled air is blown toward the upper body of each occupant of the vehicle through the opening 25. A foot opening 27 is disposed on the rear side of the opening 23. A rotatable plate-shaped foot door 28 attached to the case 11 opens and closes the opening 27. The controlled air is blown toward the feet of each occupant of the vehicle through the opening 27. The doors 24, 26 and 28 are connected with one another through a link mechanism (not shown) and are driven by an electric driving unit (not shown) such as a servo motor.

The control device 101 may have a vehicle compartment temperature sensor 33 disposed outside the case 11 of the air conditioning unit 10 within the vehicle compartment, and an air condition control unit 34 for controlling the conditioning unit 10 according to the measured result of the sensor 33 to regulate the volume and temperature of the controlled air. The sensor 33 measures the temperature of the vehicle compartment. In response to manipulation by the occupant, the control unit 34 controls the fan motor 17 of the blower 15, the doors 12, 20, 24, 26 and 28 and the volume of the coolant fed to the evaporator 18 according to the measured result of the sensor 33. Therefore, the volume and temperature of the controlled air outputted from the conditioning unit 10 can be regulated based on the temperature of the vehicle compartment. The control unit 34 has a microcomputer with a central processing unit, a read only memory and a random access memory and peripheral circuits. The control unit 34 receives sensor signals of other sensors (not shown) and manipulation results of switches disposed on a control panel (not shown) and outputs control signals to electric driving units and a motor driving circuit to control the doors 12, 20, 24, 26 and 28 and the motor 17.

The control unit 49 communicates with the control unit 34. The control unit 49 may control the door 32 according to the measured results of the sensors 33 and 47 to set the door 32 to a state of closing the suction duct 31 or a state of closing the air duct 30.

Figure 2:
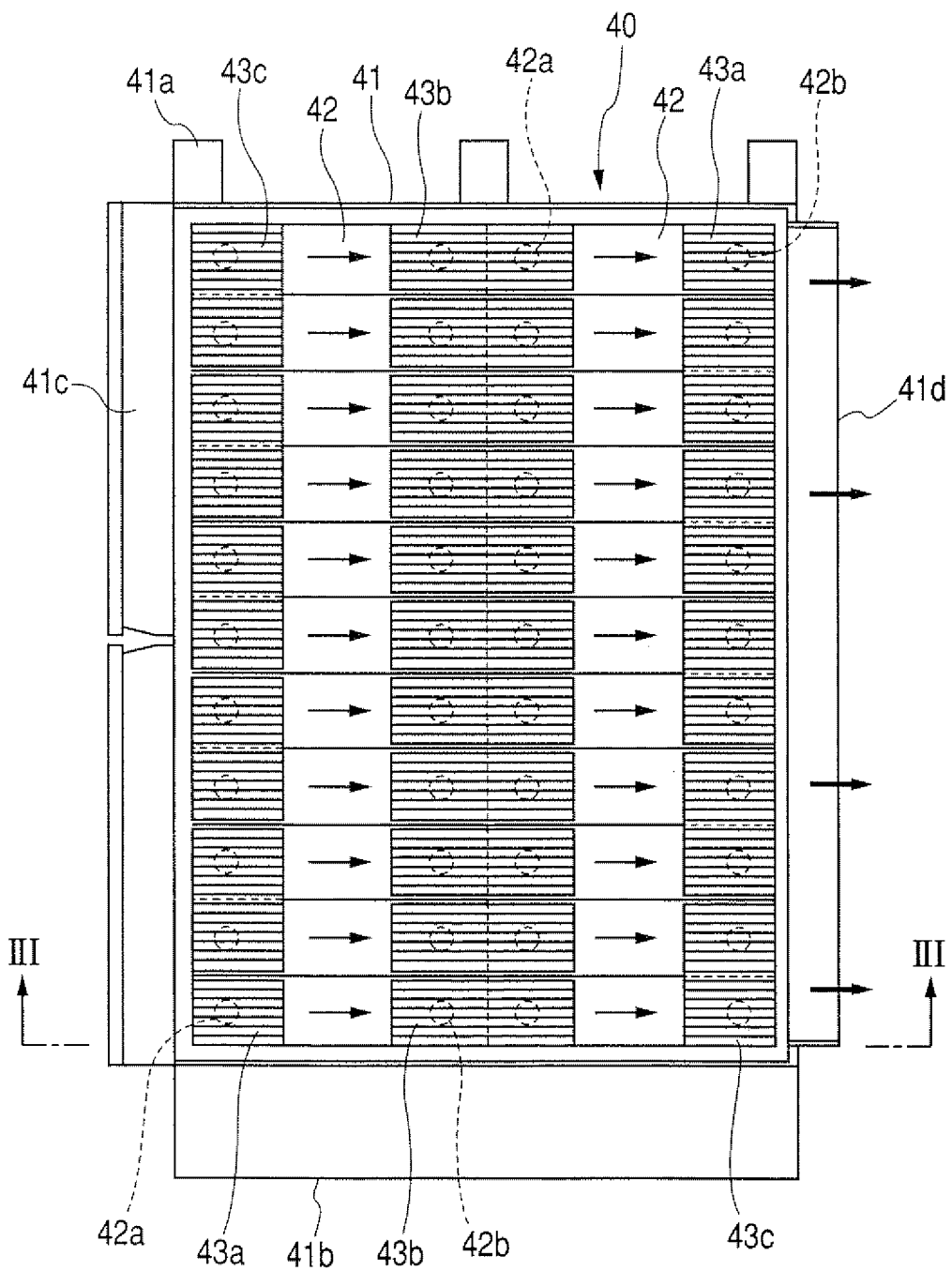
FIG. 2 is a plan view of the battery pack seen from the upper side of a vehicle.
Figure 2:
Figure 2:

The structure of the battery pack 40 will be described in detail with reference to FIG. 2 and FIG. 3. FIG. 2 is a plan view of the battery pack 40 seen from the upper side of the vehicle, while FIG. 3 is a sectional view taken substantially along line III-III of FIG. 2.

Figure 3:
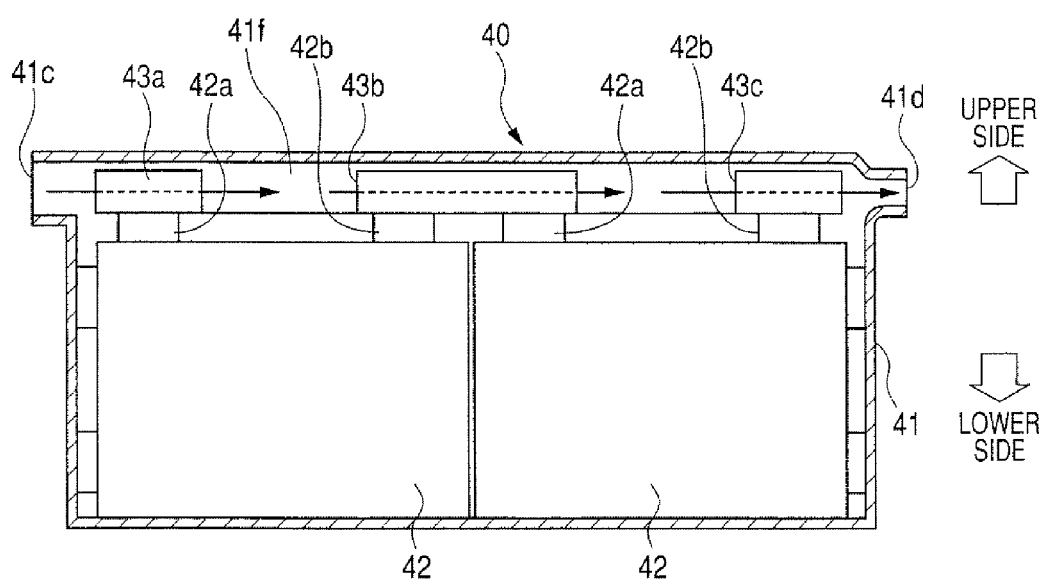
FIG. 3 is a sectional view taken substantially along line III-III of FIG. 2.

As shown in FIG. 2 and FIG. 3, the pack 40 has a pack case 41 formed in a rectangular parallelepiped shape and a plurality of battery cells 42 accommodated in the case 41. The upper and bottom surfaces of the case 41 are considerably wider than four side surfaces of the case 41. The case 41 is made of resin or steel. Each cell 42 is a secondary battery to be rechargeable. Each cell 42 is, for example, formed of a nickel-metal hydride battery, a lithium ion battery, a lithium polymer battery or the like. The pack 40 is disposed under the front seat (e.g., passenger seat) 3 in the vehicle compartment. However, the pack 40 may be disposed under any seat, between a driver's seat (not shown) and the passenger seat 3, or between a rear seat 4 and a trunk room. For the maintenance of the pack 40, the case 41 has at least one surface detachable from the case 41 to take out the battery cells 42 from the case 41.

A plurality of attaching portions 41a are disposed on one side surface of the case 41 so as to be connected with the vehicle body by bolts. A device box 41b is disposed on one side surface of the case 41 opposite to the portions 41a to accommodate a battery monitoring unit such as sensors measuring the temperature and the like of the battery cells 42, a control unit controlling the battery cells 42, a wire harness connecting the units, and the like.

An air passing space 41f (see FIG. 3) is formed in the upper inside portion of the case 41, and the battery cells 42 are placed in the lower inside portion of the case 41 so as to face the space 41f. An opening portion 41d is formed on the rear surface of the case 41, and the space 41f extends straight from the duct connecting portion 41c to the opening portion 41d. The downstream end of the duct 30 is connected with the portion 41c, so that the controlled air outputted from the air conditioning unit 10 to the duct 30 flows through this space 41f. The opening portion 41d is opened near the lower front position of the rear seat 4.

The case 41 has the bottom surface on which the battery cells 42 are disposed to be directly in contact with the case 41. Therefore, the controlled air passing through the space 41f is blown against the upper surface of the battery cells 42, and the battery cells 42 receive the heat of the hot cooling water from the bottom surface of the battery cells 42. The number of battery cells 42 is, for example, equal to fifty. The cells 42 are arranged in a matrix shape to form a plurality of serial blocks adjacent to one another along a direction perpendicular to a flow direction (indicated by arrows in FIG. 2) of the controlled air. Each serial block is formed of two battery cells 42 electrically connected with each other in series and arranged along the flow direction. The longitudinal direction of each cell 42 accords with the flow direction. The serial blocks are electrically connected with one another in series. The cells 42 occupy all inner area of the case 41 when the case 41 is seen from the upper side. Each battery cell 42 is formed in a rectangular parallelepiped shape having flattened outer surfaces and is covered with a packing case made of resin to be electrically insulated from the other cells 42.

Each battery cell 42 has a positive electrode terminal 42a and a negative electrode terminal 42b protruded from the case of the cell 42 on end surfaces of the cell 42 opposite to each other in the flow direction (i.e., longitudinal direction of the serial block). In each serial block, the terminal 42b of one cell 42 is connected with the terminal 42a of another cell 42 at a first electrode connection. In each pair of serial blocks adjacent to each other, the terminal 42b of one cell 42 of one serial block is connected with the terminal 42a of one cell 42 of another serial block at a second electrode connection. Therefore, the cells 42 are electrically connected in series so as to start from the terminal 42a of the first cell 42 (disposed at the bottom left side in FIG. 2) and to end at the terminal 42b of the final cell 42 (disposed at the upper right side in FIG. 2). A positive electrode of the pack 40 is connected with the terminal 42a of the first cell 42 on the upstream side of the controlled air stream, and a negative electrode of the pack 40 is connected with the terminal 42b of the final cell 42 on the downstream side of the controlled air stream. The power line L1 is connected with the positive and negative electrodes of the pack 40 and the hybrid inverter so as to supply the electric power of the pack 40 to the inverter.

The pack 40 has a plurality of heat transfer fins 43 (43a, 43b, 43c) disposed in the space 41f such that the fins 43 are exposed to the controlled air passing through the space 41f. The position of the fins 43 in the upper direction is substantially the same as the position of the opening portions 41c and 41d. The fins 43a are, respectively, disposed on the terminal 42a of the first cell 42 and the terminal 42b of the final cell 42. The fins 43b are, respectively, disposed on the first electrode connections. The fins 43c are, respectively, disposed on the terminals 42a and 42b of the second electrode connections. Each fin 43 is formed of a well-known wave-shaped fin made of aluminum alloy. Crest and root portions of the fin 43 are alternately arranged along the flow direction. A side wall is formed between the crest and root portions in each pair so as to extend along the flow direction. A louver formed by press work is disposed on each side wall so as to stand on the wall.

An electrically insulating member having a high thermal conductivity may be disposed between each fin 43 and the terminal 42a or 42b to electrically insulate the fins 43 from the terminals 42a and 42b of the cells 42. Alternatively, when the fins 43 are directly disposed on the terminals 42a and 42b of the cells 42, the adjacent fins 43 in each pair are disposed sufficiently away from each other to reliably obtain the electric insulation of the fins 43 from each other.

The air passing space 41f extends the whole upper space of the cells 42, so that the controlled air flows through the whole upper space of the cells 42. When the controlled air collides with or passes through each fin 43, the controlled air changes the heat with the fin 43 to heat or cool the fin 43. Therefore, the fins 43 can dissipate the heat of the cells 42 to the controlled air or transmit the heat received from the controlled air to the cells 42. Then, the controlled air is outputted from the case 41 through the portion 41d and is blown against the feet of an occupant sat on the rear seat 4.

The temperature sensors 47 are, respectively, attached to the upper surface of the group of battery cells 42 on the upstream side, the downstream side and the center of the space 41f. The control unit 49 receives the measured results of the sensors 47 and controls the controller 46 according to the measured results of the sensors 47. The controller 46 controls the electric heater 45 directly attached to the side surfaces of the battery pack 40 on the upstream and downstream sides to set the temperature of the cells 42 at the upstream side, the temperature of the cells 42 at the downstream side and the temperature of the cells 42 at the center of the pack 40 at values approximately equal to one another or having small differences with one another.

The control device 101 may have a seat insert portion 41e (see FIG. 1) and a second change door 48. The portion 41e is protruded upward from the space 41f and is opened inside the front seat 3. The door 48 opens one of the portions 41d and 41e and closes the other portion. The control unit 49 communicating with the control unit 34 controls the door 48 according to the measured results of the sensors 33 and 47 such that the controlled air passing through the space 41f is blown out from the portion 41d or the portion 41e.

For example, when the control unit 49 judges according to the measured results of the sensors 33 and 47 that the controlled air blown against the pack 40 is cooled or warmed so as to give uncomfortable feeling to the occupants, the control device 49 controls the door 48 such that the controlled air is blown out from the portion 41e. In contrast, when the control unit 49 judges that the controlled air blown against the pack 40 gives comfortable feeling to the occupants, the control device 49 controls the door 48 such that the controlled air is output from the portion 41d to be blown against the feet of the occupant. Accordingly, the controlled air can be output into the vehicle compartment without giving any uncomfortable feeling to the occupants.

The circulation system of the hot cooling water circulated through the circulating passage 50 is described in detail. This hot cooling water gives the heat to the air through the heater core 19 of the air conditioning unit 10 and gives the heat to the pack 40 through the heater 44 directly attached to the bottom or lower surface of the case 41 of the battery pack 40. Then, the water is cooled in a radiator (not shown).

More specifically, the cooling water heated in the engine 1 is again heated in the heat exchanger 60 disposed in the circulating passage 50 to produce the hot cooling water. The passage 50 has the passage 51 branched from the passage 50. This passage 51 is communicated with the hot water heater 44 and is returned to the passage 50 at a return point. The valve 52 disposed at the return point or branching point allows the hot cooling water to pass through the passage 51 and to be fed to the heater 44 or stops the flow of the hot cooling water in the passage 51. The control unit 49 controls the valve 52 according to the measured result of at least one of the sensors 47, so that the hot cooling water is supplied to the heater 44 through the valve 52 or the supply of the hot cooling water is stopped.

Figure 4:
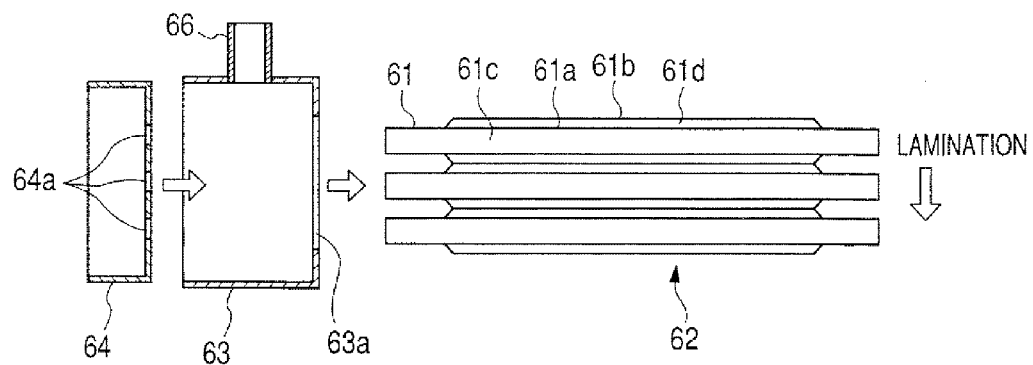
FIG. 4 is an exploded side view, partially in cross-section, of a portion of a heat exchanger shown in FIG. 1.

The heat exchanger 60 will be described in detail with reference to FIG. 4 and FIG. 5. FIG. 4 is an exploded side view, partially in cross-section, of a portion of the heat exchanger 60, while FIG. 5 is a side view, partially in cross-section, of the left half portion of the heat exchanger 60.

Figure 5:
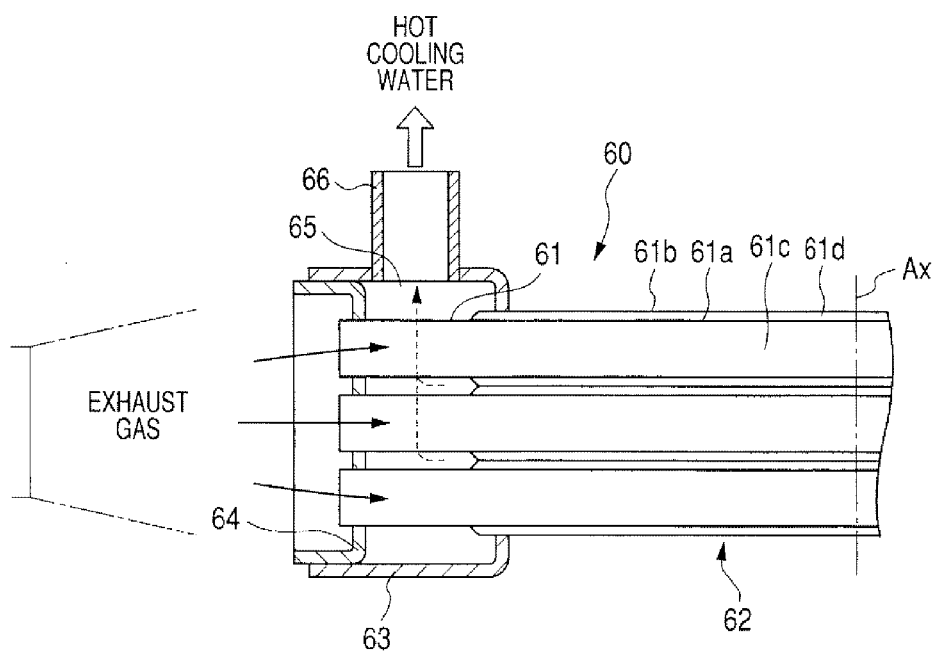
FIG. 5 is a side view, partially in cross-section, of the left half portion of the heat exchanger shown in FIG. 4.

As shown in FIG. 4 and FIG. 5, the heat exchanger 60 is produced by attaching a first left tank member 63 to a heat exchanging core 62 and then attaching a second left tank member 64 to the heat exchanging core 62. Further, first and second right tank members (not shown) structured in the same manner as the members 63 and 64 are attached to the core 62 such that the heat exchanger 60 is symmetric with respect to the center axis Ax. More specifically, the core 62 has a lamination of a plurality of double tubes 61 each of which has an inner tube 61a and an outer tube 61b. The tank member 63 is attached to the core 62 such that the double tubes 61 are inserted into a first insertion hole 63a of the member 63. The tank member 66 is attached to the core 2 such that each of the inner tubes 61a is inserted into a second insertion hole 64a of the member 64. The exhaust gas enters the inner space of the member 64, passes through a plurality of inner passages 61c of the inner tubes 61a and is output from the inner space of the second right tank member. The cooling water of the circulating passage 50 enters the inner space of the first right tank member and passes through a plurality of outer passages 61d surrounded by the tubes 61a and 61b to receive the heat from the exhaust gas passing through the passages 61c. Therefore, the hot cooling water is produced. This hot cooling water is gathered in the inner space 65 of the member 63 and is output from an outlet 66 of the member 63 to the circulating passage 50.

Figure 6A:
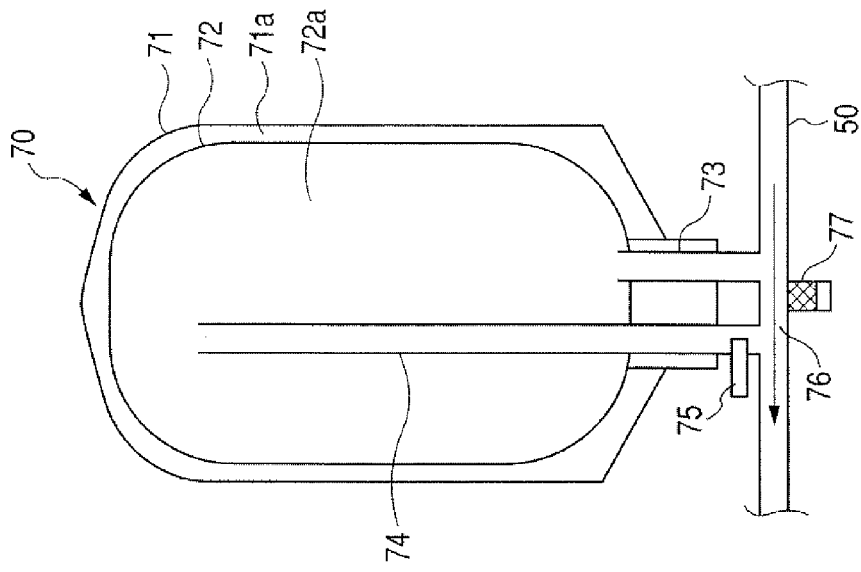
FIG. 6A is a schematic side view showing the internal structure of a heat storage tank set in the water holding state.

The heat storage tank 70 is disposed in the circulating passage 50 on the downstream side of the heat exchanger 60 to hold the heat of the hot cooling water. The tank 70 is set in one of a water holding state and a water bypass state under control of the control unit 49. FIG. 6A is a schematic side view showing the internal structure of the tank 70 set in the water holding state, while FIG. 6B is a schematic side view showing the internal structure of the tank 70 set in the water bypass state.

Figure 6B:
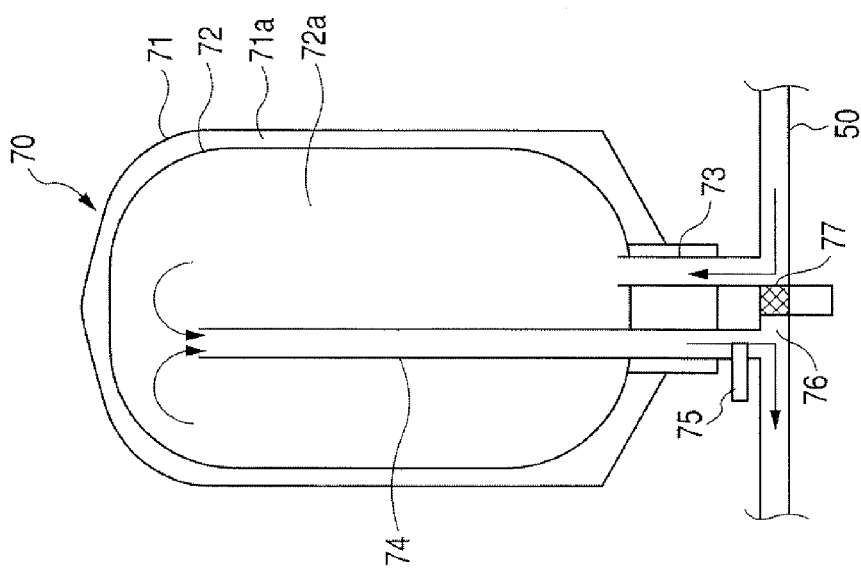
FIG. 6B is a schematic side view showing the internal structure of the heat storage tank set in the water bypass state.

As shown in FIG. 6A and FIG. 6B, the tank 70 has an outer tank wall 71 and an inner tank wall 72 connected with each other by welding, brazing or the like. Each of the walls 71 and 72 is made of stainless steel superior in corrosion resistance. The walls 71 and 72 form a vacuum space 71a therebetween, so that the tank 70 has a heat insulated structure. A water holding space 72a is formed in the wall 72. The tank 70 has an inlet pipe 73 communicating the space 72a with the circulating passage 50 extending from the heater exchanger 60, an outlet pipe 74 communicating the space 72a with the circulating passage 50 connected with the heater 44, and a bypass passage 76 directly communicating the heat exchanger 60 and the heater 44 while bypassing the tank 70. The pipe 74 has a riser reaching the upper portion of the space 72a. Therefore, a portion of the hot cooling water having the higher temperature is gathered in the upper portion of the space 72a due to the natural convection of the hot cooling water in the space 72a and is outputted to the heater 44 and the heater core 19 through the pipe 74.

The tank 70 has a bypass valve 77 for opening and closing the bypass passage 76, and a tank temperature sensor 75 for measuring the temperature of the hot cooling water outputted from the tank 70. The control unit 49 controls the valves 52 and 77 according to the measured result of the sensor 75. When the valve 77 is closed, as shown in FIG. 6A, the hot cooling water outputted from the heat exchanger 60 flows into the space 72a. In contrast, when the valve 77 is opened, as shown in FIG. 6B, the hot cooling water flows through the circulating passage 50 without being held in the tank 70.

With this structure of the control device 101, when the engine 1 is not operating, the valve 52 closes the circulating passage 51, and the by pass valve 77 is opened. When the driving operation of the engine 1 is started, the control unit 49 judges according to the measured results of the sensors 47 whether the temperature of the battery pack 40 is too low or high or is set in an appropriate range. Further, the blower 15 is automatically or manually operated.

When the control unit 49 judges that the temperature of the battery pack 40 is too low, the control device 101 performs a heating process for the pack 40. More specifically, the control unit 49 judges according to the measured result of the sensor 75 whether or not the temperature of the cooling water stored in the tank 70 is high. When the cooling water stored in the tank 70 has the comparatively high temperature, the control unit 49 closes the bypass valve 77 such that the cooling water of the tank 70 flows through the circulating passage 50. Therefore, the temperature of the cooling water of the passage 50 is rapidly heightened. Further, the cooling water of the circulating passage 50 is heated in the engine 1 and/or the heat exchanger 60.

When the control unit 49 judges according to the measured result of the sensor 75 that the cooling water of the passage 50 is heated to produce a hot cooling water set to a first temperature or more, the control unit 49 controls the valve 52 such that the hot cooling water passes through the heater core 19. Further, the control unit 49 controls the door 32 to communicate the duct 30 and the pack 40. Therefore, air blown by the blower 15 is heated by the heater core 19 to produce a temperature controlled air in the air conditioning unit 10, and the controlled air passes through the duct 30 and is blown against the fins 43 of the pack 40 to give the heat of the controlled air to the upper surfaces of the battery cells 42. Therefore, the temperature of the pack 40 is gradually raised by the controlled air.

Further, the control unit 49 judges according to the measured results of the sensors 33 and 47 whether a portion of the controlled air outputted from the space 41f of the pack 40 is useful to further warm up the vehicle compartment directly warmed up by the remaining portion of the controlled air. When the controlled air of the space 41f is useful, the control unit 49 adjusts the door 48 such that the controlled air is blown out from the opening portion 41d. In contrast, when the controlled air of the space 41f is inadequate to further warm up the vehicle compartment, the control unit 49 adjusts the door 48 such that the controlled air is blown out from the portion 41e. Therefore, no discomfort is caused to the occupant.

Thereafter, when the control unit 49 judges according to the measured result of the sensor 75 that the hot cooling water of the passage 50 is further heated to a second temperature higher than the first temperature, the control unit 49 controls the valve 52 such that the hot cooling water is circulated through the circulating passage 51. Therefore, the hot cooling water is supplied to the hot water heater 44 directly attached to the bottom surface of the pack 40.

Thereafter, when the control unit 49 judges according to the measured results of the sensors 47 that the temperature of the battery pack 40 is raised at a target value, the control unit 49 controls the valve 52 such that the hot cooling water of the passage 50 is not supplied to the heater 44.

Accordingly, because the pack 40 is warmed up by the heater 44, the battery pack 40 can be regulated in an adequate temperature range by the hot cooling water. Further, as compared with the transferred heat determined by the first heat transfer between the hot cooling water of the heater core 19 and air and the second heat transfer between the conditioned air and the pack 40, the transferred heat obtained in the thermal conduction between the hot cooling water of the heater 44 and the pack 40 becomes high. Therefore, the temperature of the pack 40 can be sufficiently and quickly raised by the heater 44.

Further, when the driving operation of the engine 1 is started, the control unit 49 may control the electric power controller 46 to immediately supply electric power of the battery pack 40 to the electric heater 45 directly attached to the side surfaces of the pack 40. Therefore, the temperature of the pack 40 is immediately raised with the heat generated in the heater 45. For example, only when the control unit 49 detects according to the measured result of the sensor 75 that the temperature of the cooling water is too low to quickly heat the pack 40, the control unit 49 controls the controller 46 to operate the heater 45.

Accordingly, even when the cooling water is set to a very low temperature, the heater 45 can rapidly warm up the pack 40 to assist the warming operation of the heater 44. Further, because the warming operation for the side surfaces of the pack 40 is performed with the warming operation for the bottom surface of the pack 40, the temperature of the pack 40 can be uniformly raised by the heaters 44 and 45. Moreover, the pack 40 is mainly warmed by the heater 44 using the exhaust gas as a heating source, the electric power consumed in the heater 45 can be lowered at a small value, so that the consumption of the electric power charged in the pack 40 can be minimized. That is, the deterioration of fuel economy can be minimized.

When the control unit 49 judges that the pack 40 is set in an appropriate temperature range, the control device 101 performs a temperature maintaining process for the pack 40 to maintain the pack 40 in the present temperature condition. More specifically, the control device 49 controls the valve 52 not to transmit the cooling water to the heater 44. When an occupant requests the air conditioning unit 10 to output the controlled air to the feet of the occupant, the control device 49 controls the valve 32 to communicate the duct 30 with the pack 40 and controls the door 48 to open the portion 41d. Therefore, the unit 10 blows out the controlled air to the feet of the occupant. In contrast, when an occupant requests the air conditioning unit 10 to output no controlled air to the feet of the occupant, the control device 49 controls the valve 32 to communicate the pack 40 with the duct 31 and to close the duct 30. Therefore, no controlled air is blown against the feet of the occupant.

When the control unit 49 judges that the temperature of the battery pack 40 is too high, the control device 101 performs a cooling process for the pack 40. More specifically, the control device 49 controls the evaporator 18 to cool the air sent from the blower 15 to produce a cooled air. Further, the control device 49 controls the valve 32 to communicate the pack 40 with the duct 30. Therefore, the cooled air is blown against the fins 43 to receive the heat of the pack 40 from the upper surfaces of battery cells 42. Therefore, the pack 40 is cooled. In this case, the cooling water is not circulated in the passage 50.

Further, when the control unit 49 judges according to the measured results of the sensors 47 that the cooled air receiving the heat from the pack 40 is useful to further cool the vehicle compartment, the control unit 49 controls the door 48 to open the portion 41d. In contrast, when the control unit 49 judges that the cooled air receiving the heat from the pack 40 is inadequate to further cool the vehicle compartment, the control unit 49 controls the door 48 to open the portion 41e. Therefore, the occupant has no uncomfortable feeling.

Effects obtained in the control device 101 will be described.

The control device 101 has the hot water heater 44 receiving the hot cooling water as a heat source, and the heater 44 is directly attached to the bottom surface of the case 41 of the battery pack 40. Therefore, when the temperature of the hot cooling water is raised with the heat of the engine 1 and/or with the exhaust gas of the engine 1, the pack 40 is warmed with the hot cooling water of the heater 44 while receiving the subsidiary heat from the controlled air of the conditioning unit 10. Accordingly, because the heat of the hot cooling water is directly transferred from the heater 44 to the pack 40 without any air intervening between the hot cooling water and the pack 40, the rate of heat transfer using the heater 44 can be considerably increased, so that the temperature of the pack 40 can be quickly and sufficiently raised.

Further, because the upper and bottom surfaces of the pack 40 opposite to each other, respectively, receive the heat from the controlled air and the heater 44, the temperature of the pack 40 can be efficiently raised.

Moreover, the heat exchanger 60 communicated with the passage 50 is disposed to recover the heat of the exhaust gas and give the recovered heat to the cooling water of the passage 50. Accordingly, even when the driving operation of the engine 1 is just started, the cooling water can be rapidly heated with the exhaust gas of the engine 1, and the temperature of the pack 40 can be quickly raised.

Further more, the tank 70 communicated with the passage 50 is disposed to hold the heat of the hot cooling water while minimizing the dissipation of the heat from the tank 70. Even when the driving operation of the engine 1 is stopped for a long time so as to cool the hot cooling water of the passage 50, the hot cooling water of the tank 70 can still maintain the high temperature. Therefore, when the driving operation of the engine 1 is started, the hot cooling water of the tank 70 is mixed with the cooling water of the passage 50 to immediately increase the temperature of the cooling water. Accordingly, the heat of the hot cooling water can be quickly transferred to the pack 40 through the heater 44, so that the temperature of the pack 40 can be quickly raised.

Further more, the electric heater 45 is directly attached to the battery pack 40. When the driving operation of the engine 1 is started, the heater 45 receives electric power from the pack 40 and subsidiarily heats the side surfaces of the pack 40. Accordingly, even when the pack 40 is considerably cooled, the temperature of the pack 40 can be quickly raised by the heater 45. Further, the electric heater 45 is attached to the side surfaces of the pack 40 which differ from the upper and bottom surfaces of the pack 40 through which the pack 40 receives the heat from the controlled air and the heater 44. Accordingly, the temperature of the pack 40 can be further quickly and sufficiently raised by the heaters 44 and 45 and the controlled air.

Further more, the temperature sensors 47 are disposed at the center and ends of the battery cells 42 of the pack 40. The heat of the pack 40 at the ends of the battery cells 42 is easily dissipated as compared with the heat at the center of the battery cells 42. Therefore, a temperature difference inevitably occurs in the pack 40. Because the sensors 47 measures the temperature of the pack 40 at the center and ends of the battery cells 42, the control unit 49 can correctly detect the average temperature of the pack 40. Accordingly, the control unit 49 can reliably raise the temperature of the pack 40 according to the measured results of the sensors 47. Further, when the heater 45 is attached to the side surfaces of the pack 40 to preferentially warm the ends of the battery cells 42, the temperature of the pack 40 can be uniformly raised.

Further more, the duct 31 opened near the internal air inlet 14 of the conditioning unit 10 is branched from the duct 30, and the door 32 is disposed at the branching point to communicate the pack 40 with the duct 30 or the duct 31. When it is expected that the controlled air blown against the pack 40 is useful to further warm or cool the vehicle compartment, the control unit 49 controls the door 32 to send the controlled air to the pack 40 and the vehicle compartment. In contrast, when it is expected that the controlled air blown against the pack 40 undesirably cools the vehicle compartment directly warmed with the controlled air or undesirably warms the vehicle compartment directly cooled with the controlled air, the controlled air blown against the pack 40 will give the uncomfortable feeling to the occupants when being blown out into the vehicle compartment. To avoid this inconvenience, the control unit 49 controls the door 32 to communicate the pack 40 with the duct 31 and to close the duct 30. Therefore, the whole controlled air of the conditioning unit 10 is blown out from at least one of the openings 23, 25 and 27 to directly warm or cool the vehicle compartment, and the air of the vehicle compartment is absorbed into the air passing space 41f of the pack 40 to warm or cool the pack 40 and is returned to the conditioning unit 10 through the duct 31.

Accordingly, the vehicle compartment can be adequately warmed or cooled with the controlled air while the pack 40 is warmed or cooled with the air of the vehicle compartment, and the controlled air gives no uncomfortable feeling to the occupants.

In this embodiment, the blower 15 of the unit 10 induces the air of the vehicle compartment to be absorbed into the pack 40. Therefore, no blowing unit is required to absorb the air of the vehicle compartment into the pack 40.

Still further, the control device 101 has the portions 41d and 41e and the door 48. When it is expected that the controlled air blown against the pack 40 is useful to further warm or cool the vehicle compartment, the control unit 49 controls the door 48 to output the controlled air from the opening portion 41d. In contrast, when it is expected that the controlled air blown against the pack 40 is inadequate to further warm or cool the vehicle compartment directly warmed or cooled with the controlled air, the control unit 49 controls the door 48 to output the controlled air from the insert portion 41e. Accordingly, the pack 40 can be warmed or cooled with the controlled air, and the controlled air blown against the pack 40 gives no uncomfortable feeling to the occupants.

Still further, the insert portion 41e is opened inside the front seat 3. Therefore, even when the controlled air blown against the pack 40 gives the uncomfortable feeling to the occupants, the control device 49 controls the door 48 such that the controlled air is blown out from the portion 41e. Accordingly, the controlled air can be output into the vehicle compartment without giving the uncomfortable feeling to the occupants.

Still further, the control device 101 has the sensors 33 and 47 and the control units 34 and 49 communicated with each other. The control unit 49 cooperated with the control unit 34 controls the doors 32 and 48 to regulate the temperature of the pack 40 and the temperature of the vehicle compartment. Accordingly, the temperature of the pack 40 and the temperature of the vehicle compartment can be adequately regulated while no uncomfortable feeling is given to the occupants.

In this embodiment, the cooling water is circulated through the passage 50 to recover the heat from the engine 1 and the exhaust gas of the engine 1 and to give the recovered heat to the air of the conditioning unit 10 and the pack 40. However, any heating fluid such as brine, antifreeze liquid or the like may be circulated through the passage 50, in place of the cooling water.

Further, in this embodiment, because the heater 45 is disposed on the side surfaces of the pack 40 positioned on the upstream and downstream sides of the pack 40 in the flow direction of the controlled air, two battery pack temperature sensors 47 are disposed on the ends of the pack 40 so as to placed near the heater 45. However, when the heater 45 is disposed on the other side surfaces of the pack 40 placed at the same position in the flow direction of the controlled air, the sensors 47 may be disposed on the other ends of the pack 40 so as to placed near the heater 45.

Embodiment 2

Figure 7:
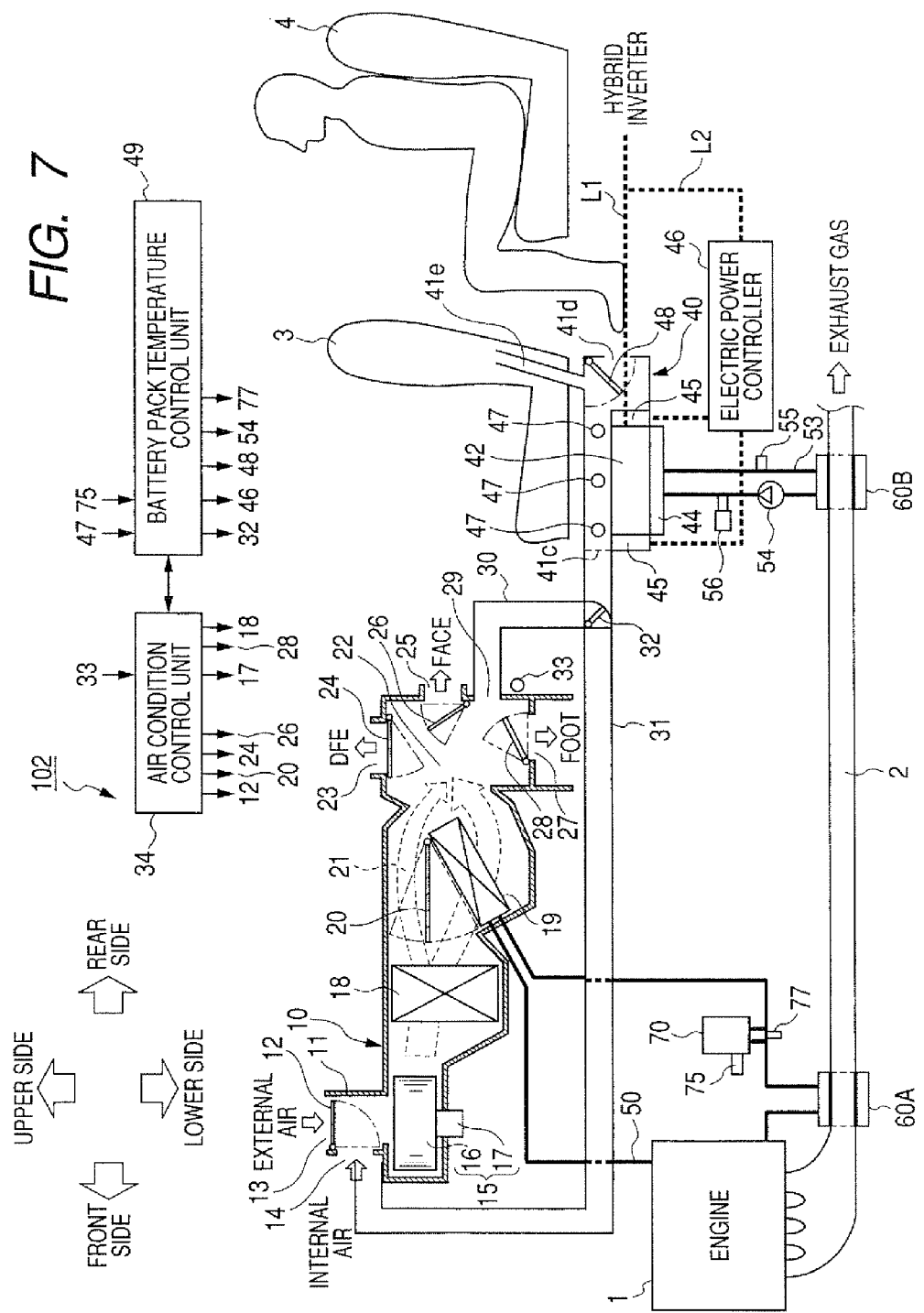
FIG. 7 is a schematic view of a temperature control device for an on-board battery pack according to the second embodiment of the present invention.

FIG. 7 is a schematic view of a temperature control device for the battery pack 40 according to the second embodiment.

As shown in FIG. 7, a temperature control device 102 has a circulation system of the hot cooling water differing from that of the device 101 shown in FIG. 1. More specifically, the circulation system of the control device 102 has the circulating passage 50 communicated with the engine 1 and the heater core 19, a first heat exchanger 60A for recovering heat of the exhaust gas of the engine 1 flowing through the exhaust pipe 2 and transmitting the recovered heat to the cooling water of the passage 50 to circulate the hot cooling water in the passage 50, the storage tank 70, a fluid circulating passage 53 filled with brine, a fluid pump 54 operated under control of the control unit 49 to circulate the brine in the passage 53, a fluid temperature sensor 55 disposed into the brine to measure the temperature of the brine circulated in the passage 53, and a second heat exchanger 60B for recovering heat of the exhaust gas of the engine 1 flowing through the exhaust pipe 2 and transmitting the recovered heat to the brine of the passage 53 to circulate the hot brine in the passage 53. The heater 44 attached to the bottom surface of the pack 40 receives the hot brine of the passage 53 as a heat source and warms the pack 40 with the hot brine.

With this structure of the control device 102, when the driving operation of the engine 1 is started, the cooling water of the passage 50 is heated, air taken into the conditioning unit 10 is heated with the hot cooling water of the passage 50 in the heater core 19 to produce the controlled air, and a portion of the controlled air is blown against the pack 40 in the same manner as in the first embodiment.

Further, the control unit 49 controls the pump 54 according to the measured result of the sensor 55 to regulate the flow rate of the brine circulated in the passage 53. For example, when the temperature of the brine measured by the sensor 55 is too low to quickly raise the temperature of the pack 40, the control unit 49 controls the pump 54 to increase the flow rate of the brine. Therefore, the recovered heat in the heat exchanger 60B is increased, so that the temperature of the pack 40 is quickly increased.

Accordingly, because the heater 44 receiving the hot brine heated in the heat exchanger 60B as a heat source is attached the bottom surface of the pack 40, the temperature of the pack 40 can be quickly and reliably raised.

Further, as compared with the circulation system in the first embodiment, because the passages 50 and 53 are separately disposed, the temperature increasing speed of the pack 40 can be precisely set independent of the heating of the controlled air.

The control device 102 may have a heat storage tank 56, disposed in the passage 53, for storing a major portion of the hot brine circulated in the passage 53. In this case, when the engine 1 is not operated for a long time, the brine of the passage 53 is cooled, but the tank 56 still stores the hot brine while minimizing the heat dissipated from the tank 56. When the driving operation of the engine 1 is started, the cooled brine of the passage 53 is circulated by the pump 54, and the hot brine of the tank 56 is mixed with the cooled brine. Therefore, the temperature of the brine is immediately raised in the passage 53.

Accordingly, even when the engine 1 is not operated for a long time, the temperature of the pack 40 can be quickly raised.

In this embodiment, the brine is circulated through the passage 53 to recover the heat from the exhaust gas of the engine 1 and to give the recovered heat to the pack 40. However, any heating fluid such as cooling water of the engine 1, antifreeze liquid or the like may be circulated through the passage 53, in place of the brine.

These embodiments should not be construed as limiting the present invention to structures of those embodiments, and the structure of this invention may be combined with that based on the prior art.

What is claimed is:

1. A temperature control device for an on-board battery pack, comprising:
    an air conditioning unit having an air conditioning functional member which regulates a temperature of air blown into a compartment of a vehicle on which the battery pack is boarded;
    an air duct through which a portion of the air, of which the temperature is regulated by the air conditioning functional member, is led to the battery pack, the temperature control device for the on-board battery pack regulating a temperature of the battery pack by leading the air to the battery pack through the air duct;
    a hot water heater receiving at least one of cooling water of an engine for running the vehicle and fluid heated by heat of exhaust gas of the engine as a heat source is disposed on the battery pack;
    a suction duct is branched from the air duct and is formed to have an exit communicated to an internal air inlet of the air conditioning unit such that air led to the battery pack is suctioned into the air conditioner through the suction duct; and
    a first change door which is disposed at a branching point, at which the suction duct is branched from the air duct, to selectively communicate the battery pack with (a) the air duct or (b) the suction duct.

2. The temperature control device for the on-board battery pack according to claim 1, wherein the air duct is connected with an upper inside portion of the battery pack, and the hot water heater is disposed on a lower surface of the battery pack.

3. The temperature control device for the on-board battery pack according to claim 2, further comprising:
    an electric heater, disposed on a side surface of the battery pack, that generates heat from electric power and heats the battery pack with the generated heat.

4. The temperature control device for the on-board battery pack according to claim 3, further comprising:
    a plurality of battery pack temperature sensors disposed on both a center and an end of the battery pack to measure a temperature of the battery pack and to control the electric heater according to measured results of the battery pack temperature sensors.

5. The temperature control device for the on-board battery pack according to claim 1, further comprising:
    a first heat exchanger for recovering the heat of the exhaust gas flowing through an exhaust pipe of the engine and for heating the fluid with the recovered heat,
    wherein the first heat exchanger transmits the fluid to the hot water heater through a first fluid circulating passage for circulating the fluid.

6. The temperature control device for the on-board battery pack according to claim 5, further comprising:
    a second fluid circulating passage, for circulating the cooling water through the engine and the heater core of the air conditioning unit, and
    a second heat exchanger for recovering the heat of the exhaust gas passing through an exhaust pipe of the engine,
    wherein the second heat exchanger is connected with the second fluid circulating passage.

7. The temperature control device for the on-board battery pack according to claim 6, further comprising:
    a heat storage tank, disposed in the second fluid circulating passage, that stores the cooling water heated with the recovered heat of the second heat exchanger.

8. The temperature control device for the on-board battery pack according to claim 6, wherein the first fluid circulating passage is provided with a heat storage tank that stores the fluid heated with the recovered heat of the first heat exchanger.

9. The temperature control device for the on-board battery pack according to claim 5, wherein the first fluid circulating passage is provided with a heat storage tank that stores the fluid heated with the recovered heat of the first heat exchanger.

10. The temperature control device for the on-board battery pack according to claim 1, further comprising:
    an electric heater, disposed on the battery pack, that generates heat from electric power and heats the battery pack with the generated heat.

11. The temperature control device for the on-board battery pack according to claim 10, further comprising:
    a plurality of battery pack temperature sensors disposed on both a center and an end of the battery pack to measure a temperature of the battery pack and to control the electric heater according to measured results of the battery pack temperature sensors.

12. The temperature control device for the on-board battery pack according to claim 1, further comprising:
    an opening portion, opened at a first position near a lower front position of a rear seat of the vehicle, and a seat insert portion, opened at a position different from the first position, are formed on a downstream side of the battery pack, to which the air having the temperature regulated by the air duct is led, and
    a change door disposed on the downstream side of the battery pack to open either the opening portion or the seat insert portion.

13. A temperature control device for an on-board battery pack, comprising:
    an air conditioning unit having an air conditioning functional member which regulates a temperature of air blown into a compartment of a vehicle to which the battery pack is boarded;
    an air duct through which a portion of the air, of which the temperature is regulated by the air conditioning functional member, is led to the battery pack, the temperature control device for the on-board battery pack regulating a temperature of the battery pack by leading the air to the battery pack through the air duct;
a hot water heater receiving at least one of cooling water of an engine for running the vehicle and fluid heated by heat of exhaust gas of the engine as a heat source is disposed on the battery pack;
an opening portion opened at a first position near a lower front position of a rear seat of the vehicle and a seat insert portion opened at a position different from the first position are formed on a downstream side of the battery pack and
a change door, disposed on the downstream side of the battery pack, for opening either the opening portion or the seat insert portion,
wherein the seat insert portion is opened inside a front seat of the vehicle.

14. The temperature control device for the on-board battery pack according to claim 13, wherein the air duct is connected with an upper inside portion of the battery pack, and the hot water heater is disposed on a lower surface of the battery pack.

15. The temperature control device for the on-board battery pack according to claim 14, further comprising:
an electric heater, disposed on a side surface of the battery pack, that generates heat from electric power and heats the battery pack with the generated heat.

16. The temperature control device for the on-board battery pack according to claim 15, further comprising:
a plurality of battery pack temperature sensors disposed on both a center and an end of the battery pack to measure a temperature of the battery pack and to control the electric heater according to measured results of the battery pack temperature sensors.

17. The temperature control device for the on-board battery pack according to claim 13, further comprising:
a first heat exchanger for recovering the heat of the exhaust gas flowing through an exhaust pipe of the engine and for heating the fluid with the recovered heat,
wherein the first heat exchanger transmits the fluid to the hot water heater through a first fluid circulating passage for circulating the fluid.

18. The temperature control device for the on-board battery pack according to claim 17, wherein the first fluid circulating passage is provided with a heat storage tank that stores the fluid heated with the recovered heat of the first heat exchanger.

19. The temperature control device for the on-board battery pack according to claim 17, further comprising:
a second fluid circulating passage, for circulating the cooling water through the engine and the heater core of the air conditioning unit, and
a second heat exchanger for recovering the heat of the exhaust gas passing through an exhaust pipe of the engine,
wherein the second heat exchanger is connected with the second fluid circulating passage.

20. The temperature control device for the on-board battery pack according to claim 19, further comprising:
a heat storage tank, disposed in the second fluid circulating passage, that stores the cooling water heated with the recovered heat of the second heat exchanger.

21. The temperature control device for the on-board battery pack according to claim 19, wherein the first fluid circulating passage is provided with a heat storage tank that stores the fluid heated with the recovered heat of the first heat exchanger.

22. The temperature control device for the on-board battery pack according to claim 13, wherein the air duct communicates to the compartment of the vehicle through the battery pack.

23. The temperature control device for the on-board battery pack according to claim 22, wherein the air duct communicates to a seat portion opened inside a front seat of the vehicle.

24. A temperature control device for an on-board battery pack, comprising:
an air conditioning unit having an air conditioning functional member which regulates a temperature of air blown into a compartment of a vehicle;
a battery pack disposed on the vehicle; and
an air duct through which a portion of the air, of which the temperature is regulated by the air conditioning functional member, is led to the battery pack, the temperature control device for the on-board battery pack regulating a temperature of the battery pack by leading the air to the battery pack through the air duct, wherein
a hot water heater receiving at least one of cooling water of an engine for running the vehicle and fluid heated by heat of exhaust gas of the engine as a heat source is disposed on the battery pack,
a suction duct is disposed to be branched from the air duct and to be opened near an internal air inlet of the air conditioning unit,
a first change door acting as a duct changing member is disposed at a branching point, at which the suction duct is branched from the air duct, to communicate the battery pack with the air duct or to communicate the battery pack with the suction duct,
an opening portion opened at a first position near a lower front position of a rear seat of the vehicle and a seat insert portion opened at a position different from the first position are formed on a downstream side of the battery pack,
a second change door, acting as a duct changing member, is disposed on the downstream side of the battery pack to open either the opening portion or the seat insert portion,
a vehicle compartment temperature sensor which measures a temperature of the vehicle compartment,
an air condition control unit which controls the air conditioning unit according to a measured result of the vehicle compartment temperature sensor,
a battery pack temperature sensor is disposed on the battery pack to measure a temperature of the battery pack,
a battery pack temperature control unit regulates the temperature of the battery pack according to a measured result of the battery pack temperature sensor, and
the air condition control unit and the battery pack temperature control unit communicate with each other and control the first and second change doors according to the measured result of the vehicle compartment temperature sensor and the measured result of the battery pack temperature sensor.

25. The temperature control device for the on-board battery pack according to claim 24, wherein the air duct is connected with an upper inside portion of the battery pack, and the hot water heater is disposed on a lower surface of the battery pack.

26. The temperature control device for the on-board battery pack according to claim 25, further comprising:

an electric heater, disposed on a side surface of the battery pack, that generates heat from electric power and heats the battery pack with the generated heat.

27. The temperature control device for the on-board battery pack according to claim 26, further comprising:
a plurality of battery pack temperature sensors disposed on both a center and an end of the battery pack to measure a temperature of the battery pack and to control the electric heater according to measured results of the battery pack temperature sensors.

28. The temperature control device for the on-board battery pack according to claim 24, further comprising:
a first heat exchanger for recovering the heat of the exhaust gas flowing through an exhaust pipe of the engine and for heating the fluid with the recovered heat,
wherein the first heat exchanger transmits the fluid to the hot water heater through a first fluid circulating passage for circulating the fluid.

29. The temperature control device for the on-board battery pack according to claim 28, further comprising:
a second fluid circulating passage, for circulating the cooling water through the engine and the heater core of the air conditioning unit, and
a second heat exchanger for recovering the heat of the exhaust gas passing through an exhaust pipe of the engine,
wherein the second heat exchanger is connected with the second fluid circulating passage.

30. The temperature control device for the on-board battery pack according to claim 29, further comprising:
a heat storage tank, disposed in the second fluid circulating passage, that stores the cooling water heated with the recovered heat of the second heat exchanger.

31. The temperature control device for the on-board battery pack according to claim 29, wherein the first fluid circulating passage is provided with a heat storage tank that stores the fluid heated with the recovered heat of the first heat exchanger.

32. The temperature control device for the on-board battery pack according to claim 28, wherein the first fluid circulating passage is provided with a heat storage tank that stores the fluid heated with the recovered heat of the first heat exchanger.

33. The temperature control device for the on-board battery pack according to claim 24, further comprising:
an electric heater, disposed on the battery pack, that generates heat from electric power and heats the battery pack with the generated heat.

34. The temperature control device for the on-board battery pack according to claim 33, further comprising:
a plurality of battery pack temperature sensors disposed on both a center and an end of the battery pack to measure a temperature of the battery pack and to control the electric heater according to measured results of the battery pack temperature sensors.

* * * * *